United States Patent
Miyazawa et al.

(10) Patent No.: US 9,641,052 B2
(45) Date of Patent: May 2, 2017

(54) CONNECTOR OF VEHICULAR ANGLED CONNECTOR-INTEGRATED SERVO MOTOR AND PRODUCTION METHOD THEREOF

(71) Applicants: TAMAGAWA SEIKI KABUSHIKI KAISHA, Nagano-ken (JP); AUTOLIV NISSIN BRAKE SYSTEMS JAPAN CO., LTD., Nagano-ken (JP); KASATANI CORP., Osaka (JP)

(72) Inventors: Yuichi Miyazawa, Nagano-ken (JP); Yoshinobu Fujimoto, Nagano-ken (JP); Yusuke Saito, Osaka (JP); Hiroyuki Nakanishi, Osaka (JP)

(73) Assignees: Tamagawa Seiki Kabushiki Kaisha, Nagano-ken (JP); Autoliv Nissin Brake Systems Japan Co., Ltd., Nagano-ken (JP); Kasatani Corp, Osaka (JP)

( * ) Notice: Subject to any disclaimer, the term of this patent is extended or adjusted under 35 U.S.C. 154(b) by 233 days.

(21) Appl. No.: 14/585,928

(22) Filed: Dec. 30, 2014

(65) Prior Publication Data
US 2015/0280533 A1    Oct. 1, 2015

(30) Foreign Application Priority Data
Mar. 25, 2014    (JP) .................................. 2014-061648

(51) Int. Cl.
*H01R 39/00* (2006.01)
*H01R 4/60* (2006.01)
(Continued)

(52) U.S. Cl.
CPC ....... *H02K 11/0094* (2013.01); *H01R 13/405* (2013.01); *H01R 39/16* (2013.01);
(Continued)

(58) Field of Classification Search
CPC ........ H01R 39/16; H01R 39/22; H01R 39/24; H01R 39/64; H01R 43/10; H01R 43/12; H01R 43/18; H02K 5/20; H02K 5/02
(Continued)

(56) References Cited

U.S. PATENT DOCUMENTS

| 6,031,444 | A | * | 2/2000 | Agata | .................... | H01R 13/68 439/874 |
| 6,371,808 | B2 | * | 4/2002 | Sakaguchi | ........... | H01R 13/405 29/855 |

(Continued)

*Primary Examiner* — Felix O Figueroa
(74) *Attorney, Agent, or Firm* — Harness, Dickey & Pierce, PLC

(57) ABSTRACT

A primary molded body having an angled connector that is integrally connected to an insulating annular body provided in a stator of a motor section, and that has a plurality of terminals extending along an axial direction of the motor section; a through-hole that is formed in the primary molded body and runs through the angled connector from an interior of the insulating annular body; a secondary molded body that is molded so as to cover the primary molded body; a secondary molded connector that is formed in the secondary molded body and covers the angled connector; and a connector opening that is formed in the secondary molded connector and communicates with the through-hole, wherein an outlet of the through-hole communicates with the connector opening.

5 Claims, 11 Drawing Sheets

(51) Int. Cl.
*H01R 29/00* (2006.01)
*H01R 13/405* (2006.01)
*H02K 11/00* (2016.01)
*H01R 43/18* (2006.01)
*H01R 39/16* (2006.01)
*H01R 39/64* (2006.01)
*H02K 5/02* (2006.01)
*H02K 3/50* (2006.01)
*H02K 5/22* (2006.01)
*H02K 5/08* (2006.01)

(52) U.S. Cl.
CPC ............. *H01R 39/64* (2013.01); *H01R 43/18* (2013.01); *H02K 3/50* (2013.01); *H02K 5/02* (2013.01); *H02K 5/225* (2013.01); *H02K 5/08* (2013.01)

(58) Field of Classification Search
USPC .............. 439/874, 875, 736, 206, 26, 16, 15
See application file for complete search history.

(56) References Cited

U.S. PATENT DOCUMENTS

| | | | |
|---|---|---|---|
| 6,861,776 B2 * | 3/2005 | Hashimoto | H01R 13/5216 439/884 |
| 7,588,444 B2 * | 9/2009 | Kataoka | H02K 3/50 439/76.2 |
| 8,925,508 B2 * | 1/2015 | Matsumoto | H02K 41/02 123/90.17 |

* cited by examiner

PRIOR ART

PRIOR ART

PRIOR ART

CONNECTOR OF VEHICULAR ANGLED CONNECTOR-INTEGRATED SERVO MOTOR AND PRODUCTION METHOD THEREOF

BACKGROUND OF THE INVENTION

1. Field of the Invention

The present invention relates to a connector of a vehicular angled connector-integrated servo motor, and to a production method thereof; more particularly, the present invention relates to a novel improvement for providing an angled connector integrally with an insulating annular body that is provided in a stator of a motor section, and for forming a vent hole between the interior of the motor section and the interior of the angled connector.

2. Description of the Related Art

Examples of conventional instances of sealed-type motor structures in which a connector is integrally connected to the housing of this type of motor include the configuration disclosed in Japanese Patent Application Publication No. 2010-267589, illustrated in FIG. 12 to FIG. 15.

Firstly, as described in Japanese Patent Application Publication No. 2010-267589 (paragraph [0003], but not shown in the figures), in the case of a straight-type connector in which an opening direction of a connector section is parallel to a side face on which the connector is held, a straight pin is caused to protrude into a molding die during molding, and the straight pin is pulled out after molding, so that a through-hole can be formed between the side face section and a connector opening.

Although a through-hole can be formed in the connector structure described above, it is however not possible to form a through-hole in accordance with a method identical to the above-described one in the case of an angled connector in which the connector opening direction and the holding side face are perpendicular to each other. Accordingly, the through-hole is feasible depending on the connector of Japanese Patent Application Publication No. 2010-267589 described above.

Specifically, as illustrated in FIG. 12 to FIG. 15, three connector sections 11 to 13 are provided at the outer peripheral face (side face) of a connector holding frame 20, as illustrated in FIG. 12. The connector holding frame 20 is made up of two L-shaped connector sections 11, 12 formed at a front-frame portion of the connector holding frame 20, and one connector section 13 that is formed at a rear-frame portion of the connector holding frame 20.

As illustrated in FIG. 13, the two L-shaped connector sections 11, 12 each fit with a respective mating connector (not shown) disposed underneath.

As illustrated in FIG. 15, specifically, the connector section 11 has a housing 14A that is contiguous with the connector holding frame 20, a plurality of terminal fittings 30A held on the housing 14A, and a vent pipe 40A provided along the plurality of terminal fittings 30A.

The housing 14A, which is made up of a synthetic resin, comprises a cylindrical section 15A that opens downward, a far wall 16A that plugs the cylindrical section 15A, and a joining support section 17A that joins the far wall 16A and the connector holding frame 20.

The cylindrical section 15A constitutes a square tube, and has formed, on the outer periphery thereof, a locking protrusion 18A for locking during fitting with a mating connector. Ribs 18B extending along the fitting direction are formed on both sides of the locking protrusion 18A.

The leading ends of the plurality of terminal fittings 30A protrude beyond the far wall 16A of the connector section 11. The terminal fittings 30A are equidistantly arrayed over two vertical tiers and seven horizontal rows shown in FIG. 14, except at the upper central section (i.e. at thirteen sites).

As illustrated in FIG. 15, each terminal fitting 30A forms a crank shape such that one end side of the terminal fitting 30A protrudes into the cylindrical section 15A, whereas the other end side that runs through the housing 14A and the connector holding frame 20, and that extends out of the connector holding frame 20 (into a casing side), is bent upward at right angles.

The upward-facing leading end section is connected to a circuit of a circuit board, not shown. For instance, various control signals are exchanged by way of the plurality of terminal fittings 30A.

The vent pipe 40A, which forms an L-shape, is provided running through the housing 14A and the connector holding frame 20, along the terminal fittings 30A, at an upper-tier central position (see FIG. 14) of the far wall 16A, at which no terminal fitting 30A is disposed.

The vent pipe 40A is metallic and has a circular vent hole that is formed running through the interior of the vent pipe 40A.

Part of a primary-molded core 41 that is provided during primary molding of a below-described connector device, protrudes at a portion, in the inner peripheral face of the connector holding frame 20, at which the plurality of terminal fittings 30A and the vent pipe 40A extend.

SUMMARY OF THE INVENTION

Conventional connectors that are integrally connected to motors exhibit the following problems that arise from the above configuration.

As described above, a metallic vent pipe is required in the case of an angled connector in which the connector opening is perpendicular to the holding side face. This is disadvantageous in terms of positioning of the vent pipe inside the cavity of a molding die during insert molding, and the number of molding steps and number of parts involved, and the cost incurred.

Air tightness inspection of a connector-integrated motor is performed through application of positive pressure/negative pressure within the motor section, regardless of whether the connector is angled or straight. In the case of a connector having no vent hole, however, there is only a pathway, towards the connector opening, along a small clearance at the boundary face between the insert-molded metal terminals and the resin. Accordingly, the time required to reach a prescribed pressure state in the interior space of the sealed connector, by air supplied from a motor, is excessively long. The duration of air tightness inspection in the connector is prolonged as a result, which impairs the production cycle time. A further concern of connectors having no vent hole arises in that the interior of the connector might absorb water when brought to negative pressure, due to temperature changes.

It is an object of the present invention, which was arrived at in order to solve the above problems, to provide, in particular, a connector of a vehicular angled connector-integrated servo motor, and a production method of the connector, wherein an angled connector is integrally provided in an insulating annular body that is provided in a stator of a motor section, and wherein a vent hole is formed, through molding, between the interior of the motor section and the interior of the angled connector.

The connector of a vehicular angled connector-integrated servo motor according to the present invention comprises: a primary molded body having an angled connector that is integrally connected to an insulating annular body provided in a stator of a motor section, and that has a plurality of terminals extending along an axial direction of the motor section; a through-hole that is formed in the primary molded body, and runs through the angled connector from an interior of the insulating annular body; a secondary molded body that is molded so as to cover the primary molded body; a secondary molded connector that is formed in the secondary molded body and covers the angled connector; and a connector opening that is formed in the secondary molded connector and communicates with the through-hole, wherein an outlet of the through-hole communicates with the connector opening, an inlet of the through-hole is positioned on an inward side of an inner wall section of the insulating annular body; an outlet of the through-hole is positioned in contact with an inner wall section of the connector opening, and an annular stay for attaching the motor section is integrally molded with the insulating annular body. A method for producing the connector of the vehicular angled connector-integrated servo motor according to the present invention comprises a step of forming a primary molded body having an angled connector that is integrally connected to an insulating annular body provided in a stator of a motor section, and that has a plurality of terminals extending along an axial direction of the motor section; a step of forming a through-hole that is formed in the primary molded body, and runs through the angled connector from an interior of the insulating annular body; a step of forming a secondary molded body so as to cover the primary molded body; a step of forming, in the secondary molded body, a secondary molded connector that covers the angled connector; and a step of forming, in the secondary molded connector, a connector opening that communicates with the through-hole, wherein an outlet of the through-hole communicates with the connector opening.

By virtue of the above features, the connector of a vehicular angled connector-integrated servo motor and production method thereof of the present invention elicit the following effects.

Specifically, the invention involves the step of forming a primary molded body having an angled connector that is integrally connected to an insulating annular body provided in a stator of a motor section, and that has a plurality of terminals extending along an axial direction of the motor section, and forming a through-hole that is formed in the primary molded body, and runs through the angled connector from the interior of the insulating annular body; a step of forming a secondary molded body so as to cover the primary molded body; a step of forming, in the secondary molded body, a secondary molded connector that covers the angled connector; and a step of forming, in the secondary molded connector, a connector opening that communicates with the through-hole, wherein an outlet of the through-hole communicates with the connector opening. As a result, it becomes possible to form the connector in two molding operations, while reducing costs and without the need for additional parts such as a vent pipe or the like. Further, the duration of air tightness inspection is shortened, and the production cycle time increased.

DESCRIPTION OF THE PREFERRED EMBODIMENTS

In the vehicular angled connector-integrated servo motor according to the present invention, an angled connector is integrally provided in an insulating annular body that is provided in a stator of a motor section, and a vent hole is formed, by molding alone, between the interior of the motor section and the interior of the angled connector.

Embodiment 1

Preferred embodiments of the connector of a vehicular angled connector-integrated servo motor according to the present invention will be explained next with reference to accompanying drawings.

Portions identical or similar to those of the conventional example will be explained using the same reference symbols.

Figure 1:
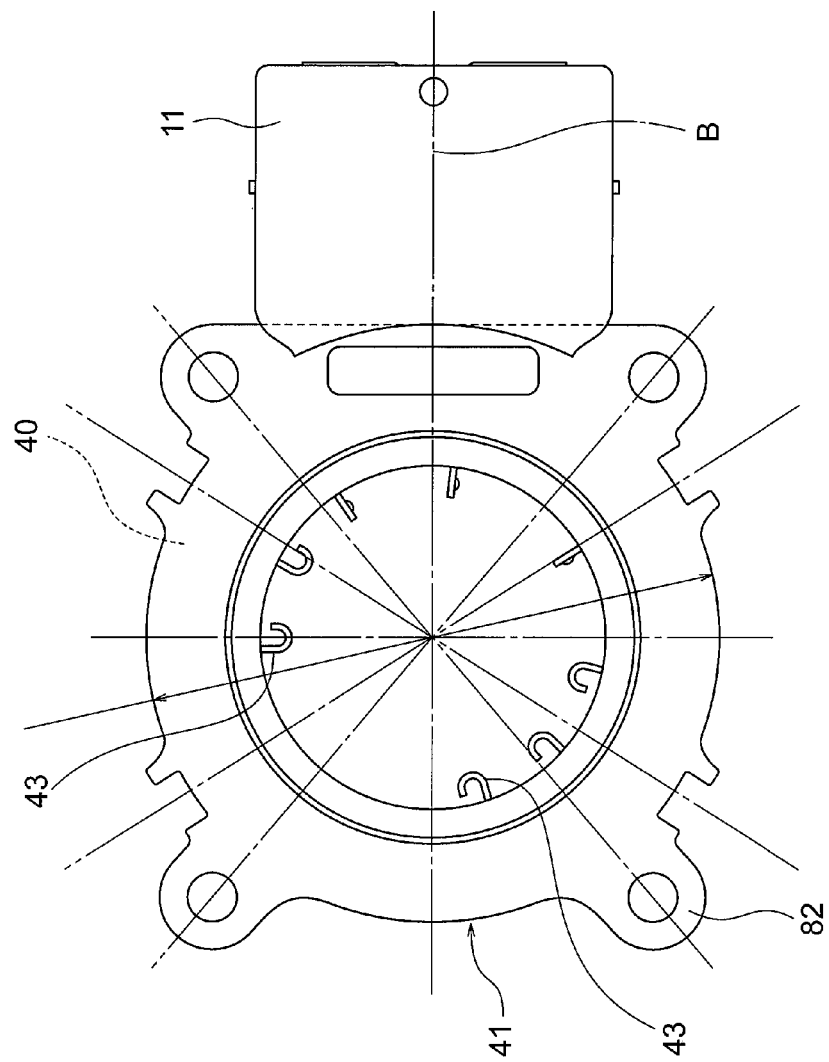
FIG. 1 is a rear-view diagram illustrating the rear face of a connector of a vehicular angled connector-integrated servo motor according to the present invention.
Figure 2:
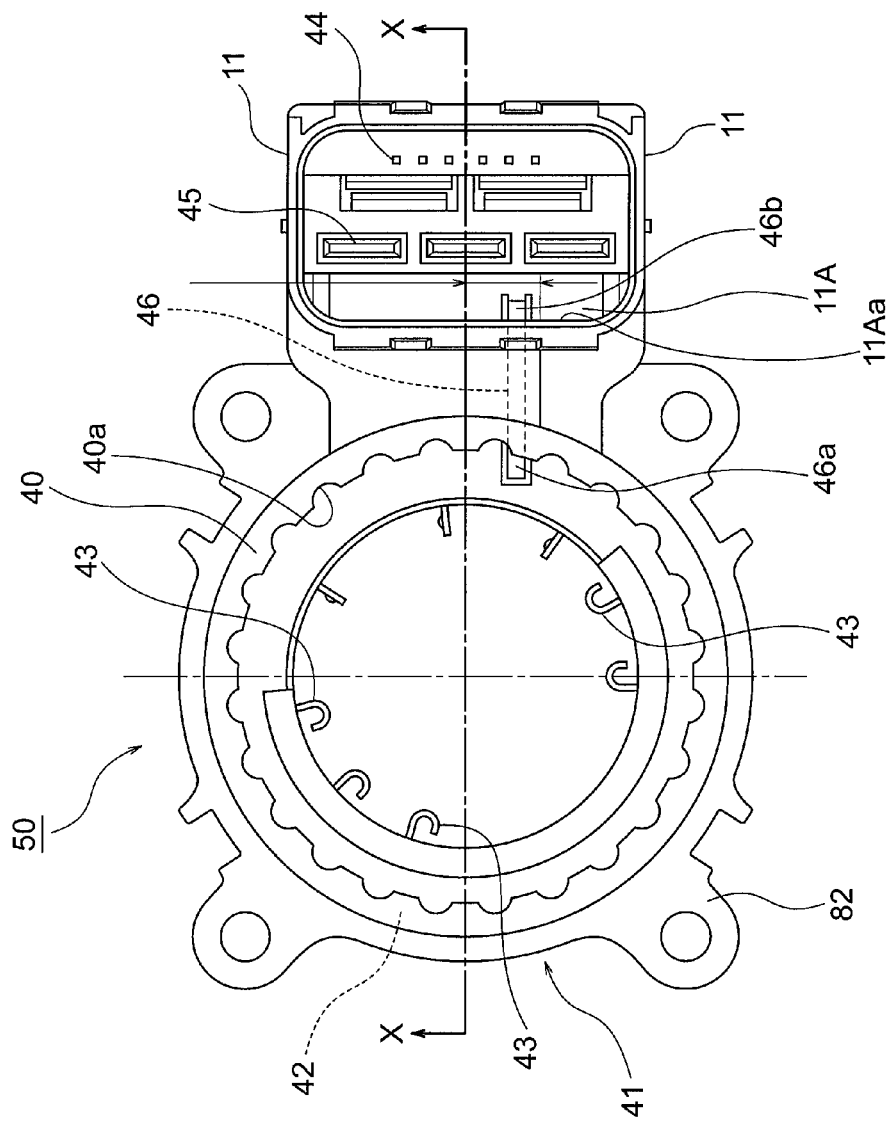
FIG. 2 is a plan-view diagram illustrating the front face in FIG. 1.
Figure 3:
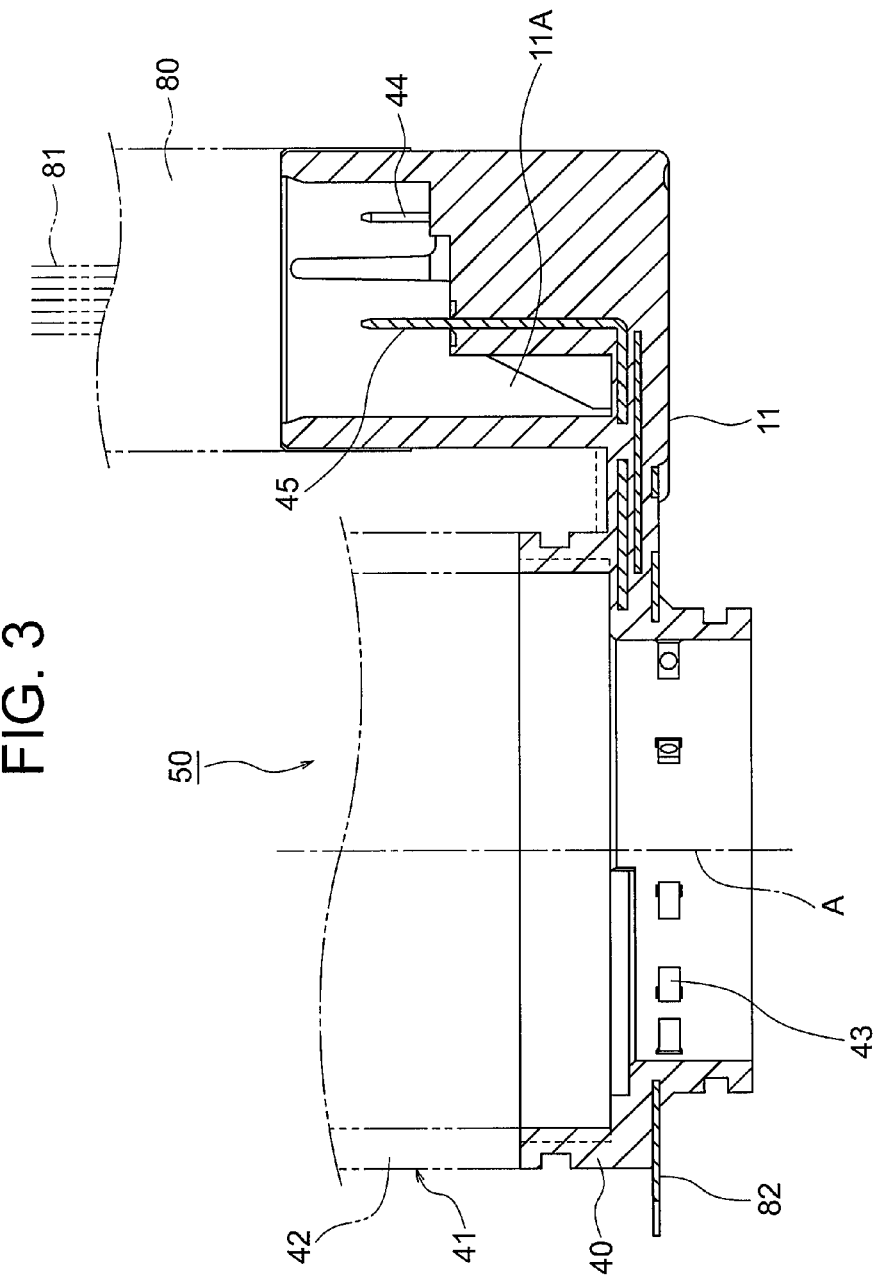
FIG. 3 is an enlarged cross-sectional diagram of X-X in FIG. 2.
Figure 4:
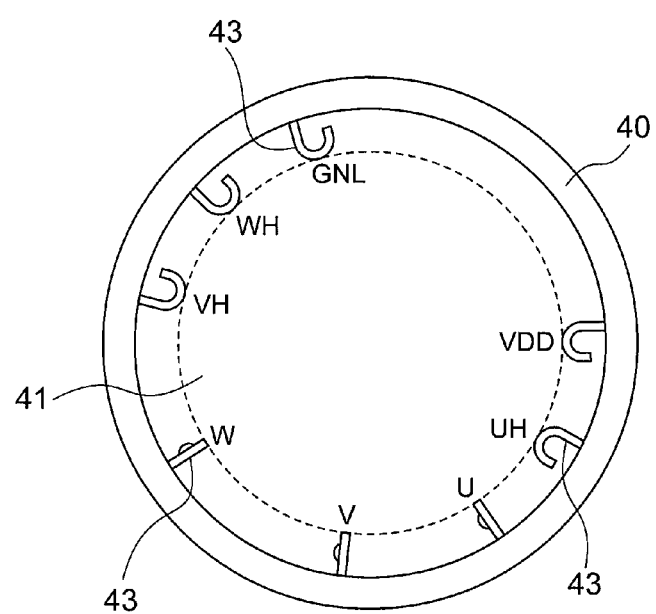
FIG. 4 is an enlarged plan-view diagram illustrating an insulating annular body of FIG. 1.

The member denoted by reference symbol 40 in FIG. 1 to FIG. 4 is an insulating annular body that is provided in a stator 42 of a motor section 41 that comprises the servo motor illustrated in FIG. 3, such that a plurality of motor terminals 43 is provided inward of the insulating annular body 40.

The angled connector 11 is integrally resin-molded with the insulating annular body 40. The angled connector 11 is formed so that the cross-sectional shape thereof is L-shaped (see FIG. 3). First terminals 44 and second terminals 45 are insert-molded, using a resin, at mutually different positions along a radial direction B, of the motor section 41.

A through-hole 46 is formed between the insulating annular body 40 and the motor section 41 side of the second terminals 45 of the angled connector 11. An inlet 46a of the through-hole 46 is formed inward of an inner wall section 40a of the insulating annular body 40, such that an outlet 46b of the through-hole 46 is formed in contact with an inner wall section 11Aa of the connector opening 11A of the angled connector 11.

The configuration in FIG. 1 to FIG. 4 described above is a configuration after completion of the vehicular angled connector-integrated servo motor 50 according to the present invention. FIG. 5A to FIG. 10 illustrate the process wherein the vehicular angled connector-integrated servo motor 50 according to the present invention is formed by injection molding.

Figure 5A:
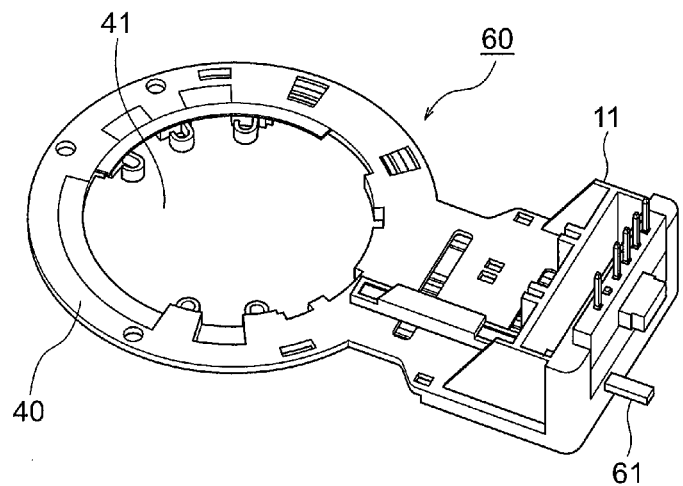
FIG. 5A is a perspective view illustrating a primary molded body with a pin shown in state (A)

In FIG. 5A there is illustrated a primary molded body 60 comprising the angled connector 11 and the insulating annular body 40, having been injection molded, in state (A). A pin 61 is integrally molded between the insulating annular body 40 and the angled connector 11 of the primary molded body 60.

Figure 5B:
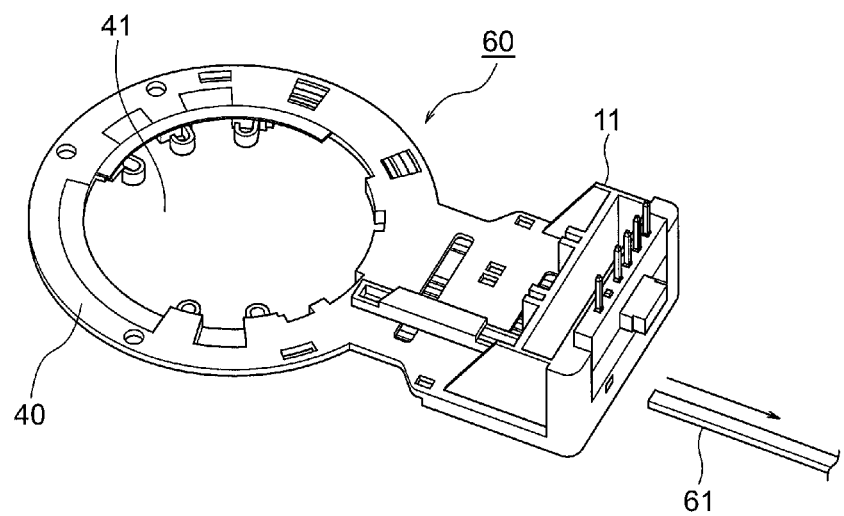
FIG. 5B is a perspective view illustrating a primary molded body with the pin of FIG. 5A shown in state (B).
Figure 6:
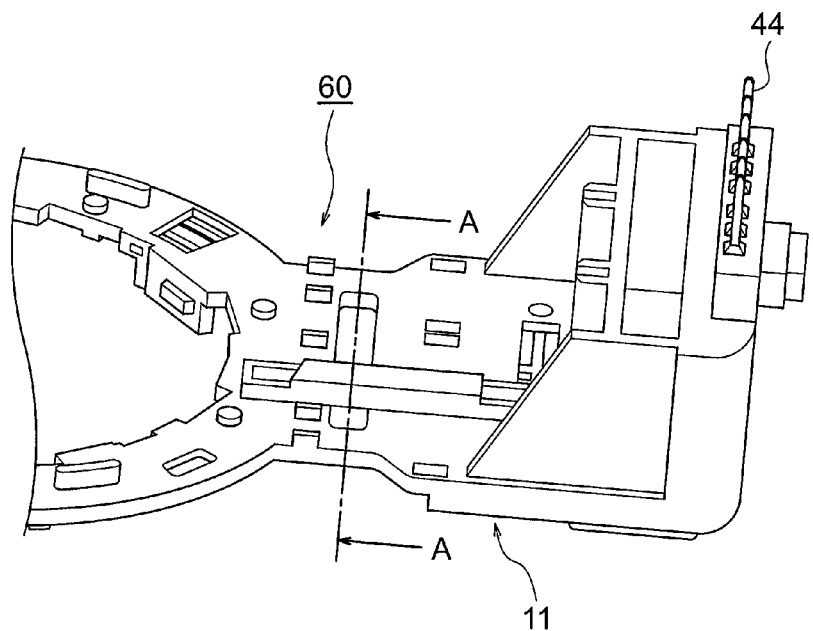
FIG. 6 is a perspective-view diagram of a relevant portion illustrating a magnified view of the primary molded body of FIG. 5B.
Figure 7:
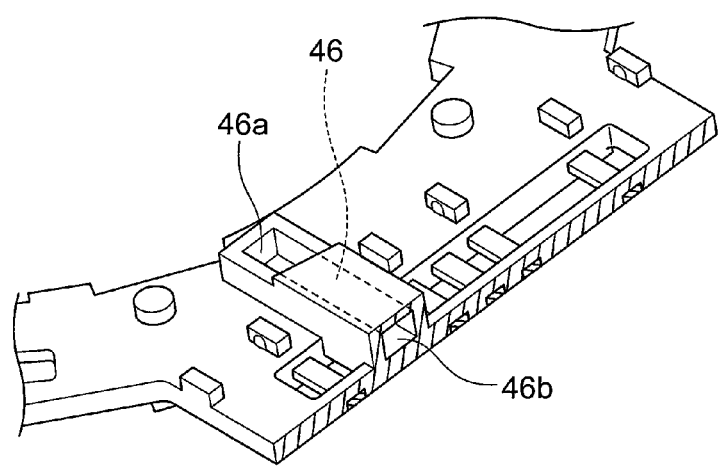
FIG. 7 is a perspective-view diagram of cross-section A-A of FIG. 6.

In state (A) described above, the pin 61 is pulled out of the primary molded body 60, to bring about state (B) as illustrated in FIG. 5B. The first terminals 44 become insert-molded onto the angled connector 11, as illustrated in FIG. 6 and FIG. 7, and the inlet 46a and the outlet 46b of the through-hole 46 are formed as illustrated in FIG. 7, with the primary molded body 60 in a state where the through-hole 46 has been formed through removal of the pin 61.

Figure 8:
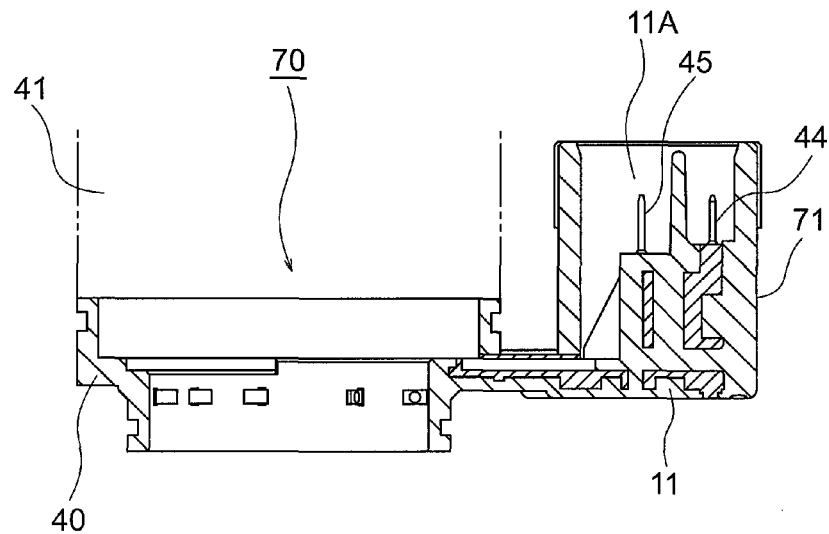
FIG. 8 is a cross-sectional diagram of a secondary molded body by secondary molding of the primary molded body of FIG. 5B.
Figure 9:
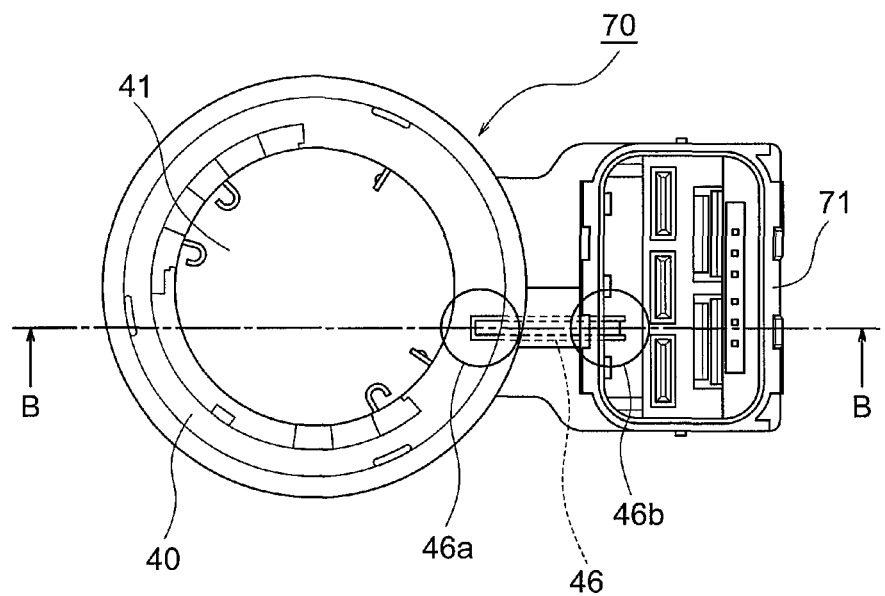
FIG. 9 is a plan-view diagram of FIG. 8.
Figure 10:
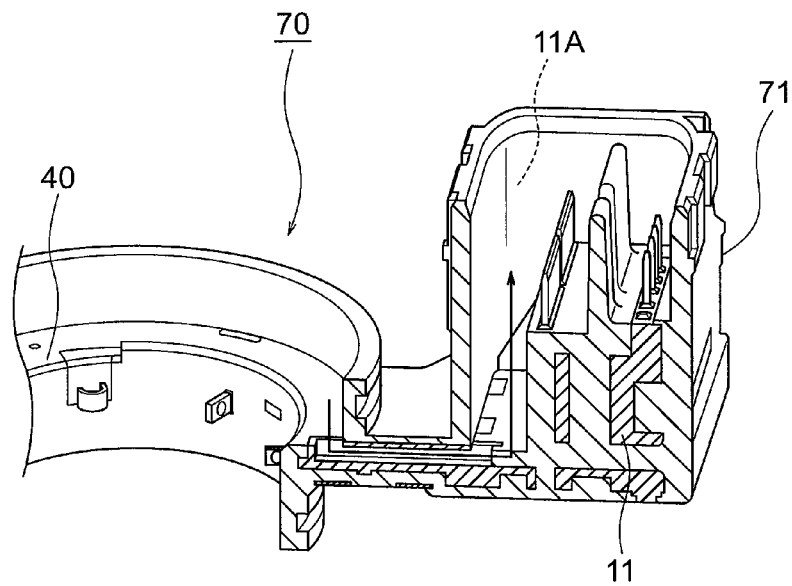
FIG. 10 is an enlarged perspective-view diagram illustrating a relevant portion of cross-section B-B of FIG. 9.

Next, FIG. 8 to FIG. 10 illustrate a secondary molded body 70 that is secondary-molded by arranging the primary molded body 60 described above in the cavity of a molding die of an injection molding machine, and by using the same resin material as that of the primary molded body 60.

The secondary molded body 70 described above is resin-molded so as to cover the entire the primary molded body 60, whereupon the second terminals 45 become integrally molded with the angled connector 11. A secondary molded connector 71 is formed thereby.

The through-hole 46 becomes completely formed by molding through inflow of resin, during secondary molding, into the inlet 46a and outlet 46b, and through arrangement of a cover member (not shown) in such a manner that the through-hole 46 does not collapse. In the resulting configuration there is preserved a state where the interior of the motor section 41 and the connector opening 11A of the angled connector 11 communicate fully with each other via the through-hole 46.

When described in the form of steps, the production method disclosed above is as follows.

A method for producing a connector of a vehicular angled connector-integrated servo motor, the method comprising: a step of forming the primary molded body 60, being integrally connected to the insulating annular body 40 that is provided in the stator 42 of the motor section 41, and having the angled connector 11 that has a plurality of terminals 44, 45 extending along the axial direction A of the motor section 41; a step of forming the through-hole 46 that is formed in the primary molded body 60 through removal of the pin 61 that runs through the angled connector 11 from the interior of the insulating annular body 40; a step of forming the secondary molded body 70 so as to cover the primary molded body 60; a step of forming the secondary molded connector 71, which covers the angled connector 11, in the secondary molded body 70; and a step of forming, in the secondary molded connector 71, a connector opening 11A that communicates with the through-hole 46; wherein the outlet 46b of the through-hole 46 communicates with the connector opening 11A.

The vehicular angled connector-integrated servo motor 50, which is the final product molded as a result of the above-described secondary molding, is configured so that the motor section 41 is built into the insulating annular body 40 and the female connector 80 is fitted onto the angled connector 11 as illustrated in FIG. 3. Signals are inputted and outputted via a lead wire 81 of the female connector 80.

Through fitting of the female connector 80 to the angled connector 11, a configuration is achieved wherein the interior of the connector opening 11A is kept in a sealed state, and the interior of the motor section 41 as well is kept in a water-tight sealed state.

Figure 11:
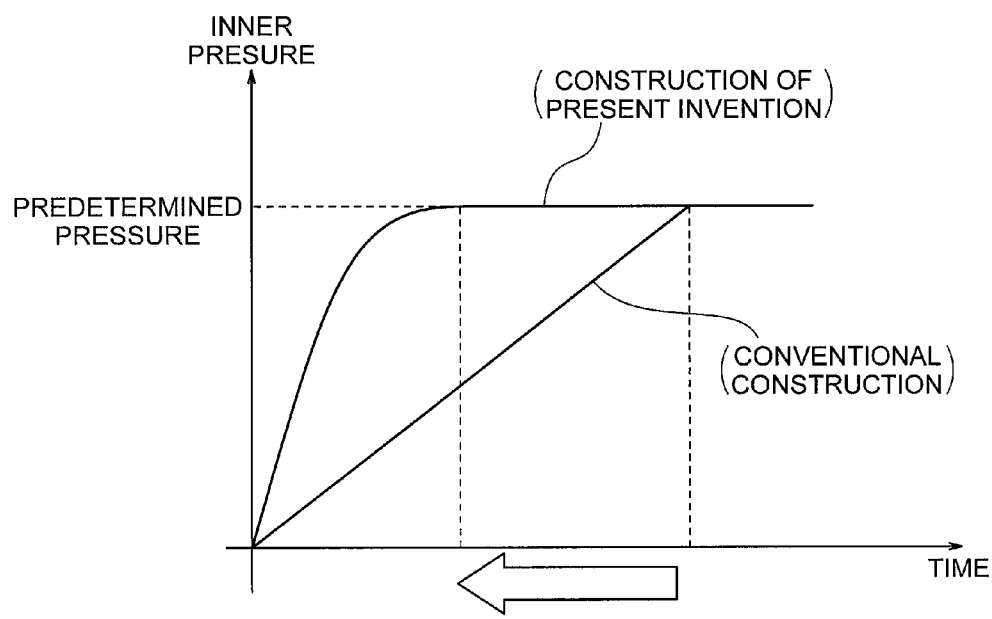
FIG. 11 is a characteristic diagram illustrating results of air tightness inspection of a connector of the present invention.
Figure 12:
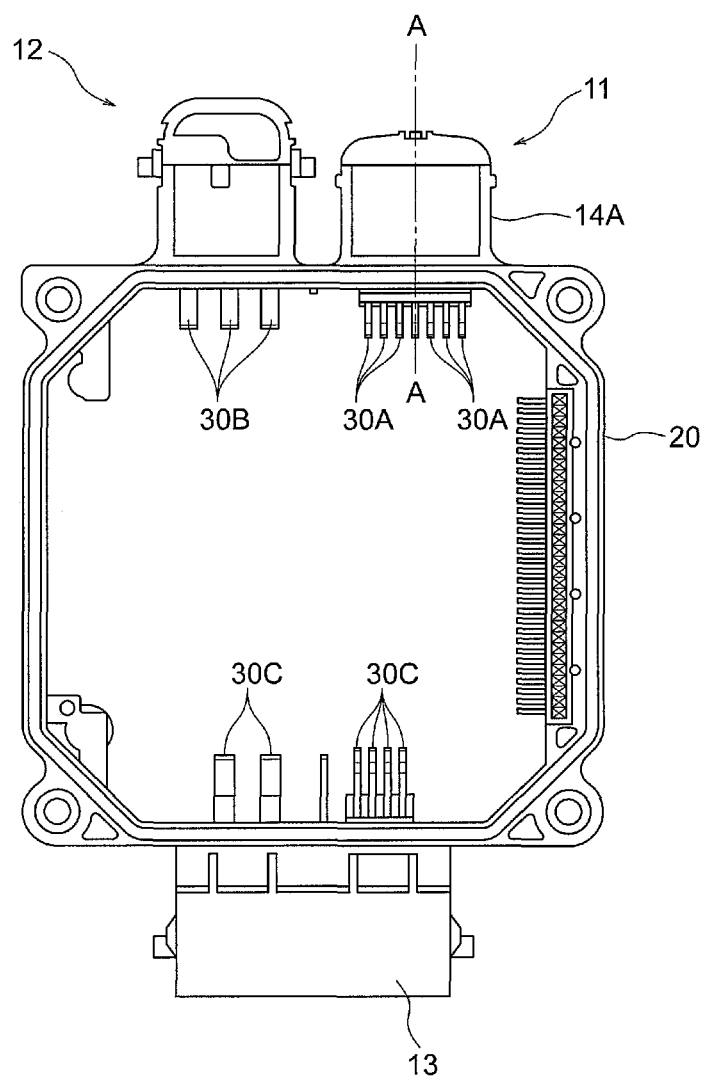
FIG. 12 is a plan-view diagram of a conventional configuration.
Figure 13:
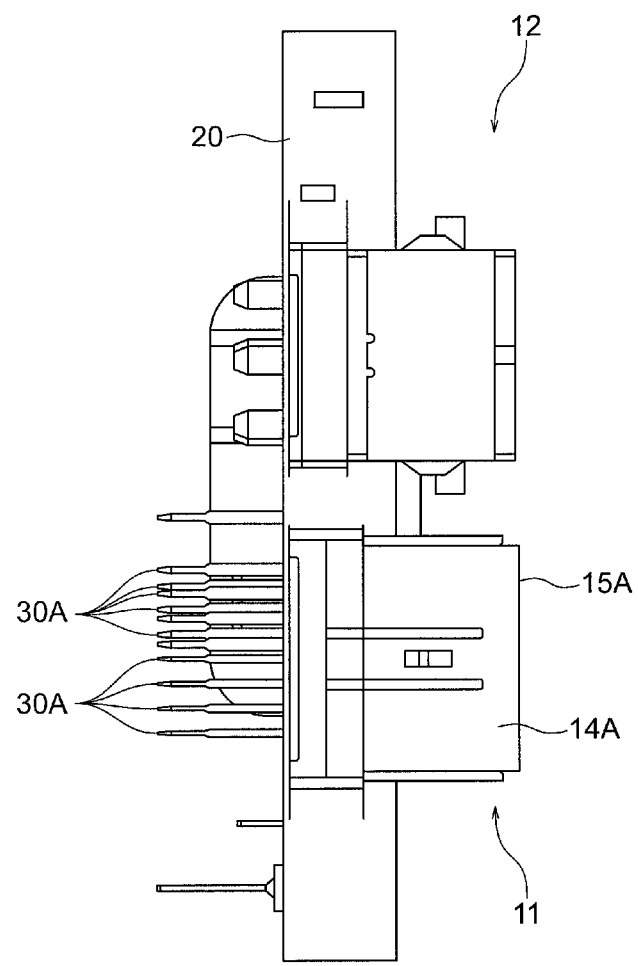
FIG. 13 is a front-view diagram of FIG. 12.
Figure 14:
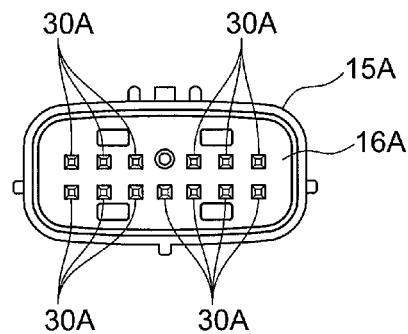
FIG. 14 is a configuration diagram illustrating the connector of FIG. 12 in a fitting direction.
Figure 15:
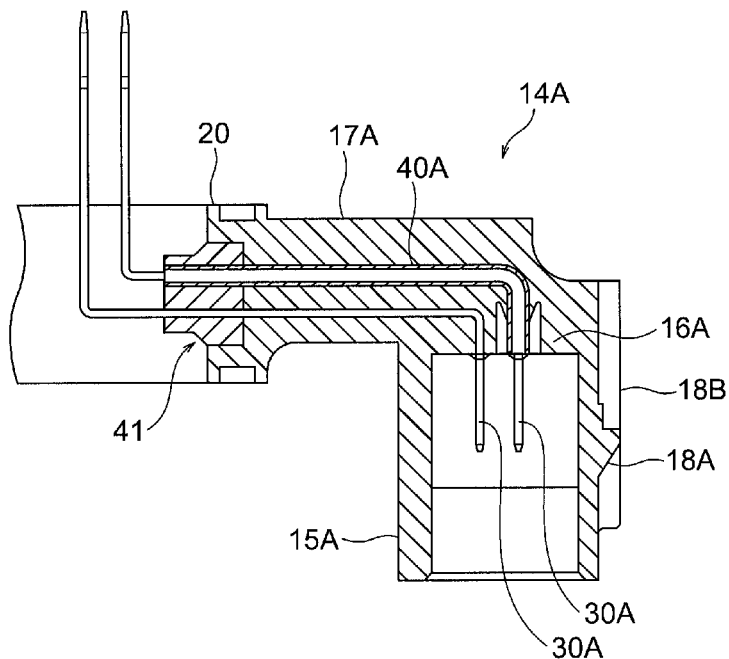
FIG. 15 is an enlarged cross-sectional diagram of A-A in FIG. 12.

Upon air tightness inspection in the production process, positive pressure is applied into the interior of the motor section 41, in the above-described state, to bring about thereby a stable state of prescribed internal pressure, and to detect leakage pressure at that time. In a conventional configuration, however, air cannot pass readily from the motor section 41 to the angled connector 11 in such a case, since the through-hole 46 of the present invention is not formed, and, a result, a prolonged time is required in order for the interior of the angled connector 11 to reach the prescribed pressure. In the present invention, by contrast, the motor section 41 side and the angled connector 11 side communicate via the through-hole 46, as illustrated in FIG. 11, and hence significant time savings can be achieved upon air tightness inspection. An annular stator 82 for attachment of the motor section 41 to another member is integrally formed in the insulating annular body 40.

The gist of the present invention as described above is as follows.

Specifically, a configuration and method wherein there are provided a primary molded body 60 having an angled connector 11 that is integrally connected to an insulating annular body 40 provided in a stator 42 of a motor section 41, and that has a plurality of terminals 44, 45 extending along an axial direction A of the motor section 41; a through-hole 46 that is formed in the primary molded body 60 through removal of a pin 61 that runs through the angled connector 11 from the interior of the insulating annular body 40; a secondary molded body 70 that is molded so as to cover the primary molded body 60; a secondary molded connector 71 that is formed in the secondary molded body 70 and covers the angled connector 11; and a connector opening 11A that is formed in the secondary molded connector 71 and communicates with the through-hole 46, wherein an outlet 46b of the through-hole 46 communicates with the connector opening 11A. Also, a configuration and method wherein the inlet 46a of the through-hole 46 is positioned on an inward side of an inner wall section 40a of the insulating annular body 40; and the outlet 46b of the through-hole 46 is positioned in contact with an inner wall section 11Aa of the connector opening 11A. Also, a configuration and method wherein an annular stay 82 for attaching the motor section 41 is integrally molded with the insulating annular body 40.

In the connector of a vehicular angled connector-integrated servo motor according to the present invention, communication of air between a motor side and a connector side is accomplished by way of a through-hole, and hence the connector can be used not only in motors, but also in equipment where air tightness is required.

What is claimed is:
1. A connector of an vehicular angled connector-integrated servo motor, comprising:
   a primary molded body having an angled connector that is integrally connected to an insulating annular body provided in a stator of a motor section, and that has a plurality of terminals extending along an axial direction of the motor section;
a through-hole that is formed in the primary molded body and runs through the angled connector from an interior of the insulating annular body;
a secondary molded body that is molded so as to cover the primary molded body;
a secondary molded connector that is formed in the secondary molded body and covers the angled connector; and
a connector opening that is formed in the secondary molded connector and communicates with the through-hole,
wherein an outlet of the through-hole communicates with the connector opening.

2. The connector of an vehicular angled connector-integrated servo motor according to claim 1, wherein an inlet of the through-hole is positioned on an inward side of an inner wall section of the insulating annular body; and the outlet of the through-hole is positioned in contact with an inner wall section of the connector opening.

3. The connector of an vehicular angled connector-integrated servo motor according to claim 1, wherein an annular stay for attaching the motor section is integrally molded with the insulating annular body.

4. The connector of an vehicular angled connector-integrated servo motor according to claim 2, wherein an annular stay for attaching the motor section is integrally molded with the insulating annular body.

5. A method for producing a connector of an vehicular angled connector-integrated servo motor, the method comprising the steps of:
forming a primary molded body having an angled connector that is integrally connected to an insulating annular body provided in a stator of a motor section, and that has a plurality of terminals extending along an axial direction of the motor section;
forming a through-hole that is formed in the primary molded body through removal of a pin that runs through the angled connector from an interior of the insulating annular body;
forming a secondary molded body so as to cover the primary molded body;
forming, in the secondary molded body, a secondary molded connector that covers the angled connector; and
forming, in the secondary molded connector, a connector opening that communicates with the through-hole,
wherein an outlet of the through-hole communicates with the connector opening.

* * * * *